US007609852B2

(12) United States Patent
Chen

(10) Patent No.: US 7,609,852 B2
(45) **Date of Patent: *Oct. 27, 2009**

(54) EARLY FIRE DETECTION METHOD AND SYSTEM BASED ON IMAGE PROCESSING

(75) Inventor: Chao-Ho Chen, Tai-Nan (TW)

(73) Assignee: Huper Laboratories Co., Ltd., Jong-Shan District, Taipei (TW)

( * ) Notice: Subject to any disclaimer, the term of this patent is extended or adjusted under 35 U.S.C. 154(b) by 618 days.

This patent is subject to a terminal disclaimer.

(21) Appl. No.: 11/419,751

(22) Filed: May 22, 2006

(65) Prior Publication Data

US 2006/0209184 A1 Sep. 21, 2006

Related U.S. Application Data

(63) Continuation-in-part of application No. 11/164,254, filed on Nov. 16, 2005, now Pat. No. 7,542,585.

(30) Foreign Application Priority Data

Nov. 16, 2004 (TW) .............................. 93135062 A

(51) Int. Cl.
*G06K 9/00* (2006.01)
*H04N 7/18* (2006.01)

(52) U.S. Cl. ........................ 382/100; 382/165; 348/143

(58) Field of Classification Search ................ 382/100, 382/103, 106, 107, 154, 155, 162, 165, 167, 382/168, 172, 181, 184, 194, 199, 203, 209, 382/218, 232, 254, 255, 274, 276, 286, 287, 382/305; 348/143, 165
See application file for complete search history.

(56) References Cited

U.S. PATENT DOCUMENTS

| | | | | |
|---|---|---|---|---|
| 7,155,029 | B2 * | 12/2006 | King et al. | 382/100 |
| 7,245,315 | B2 * | 7/2007 | Sadok et al. | 348/165 |
| 7,256,818 | B2 * | 8/2007 | Sadok et al. | 348/143 |
| 7,280,696 | B2 * | 10/2007 | Zakrzewski et al. | 382/218 |
| 7,302,101 | B2 * | 11/2007 | Zakrzewski et al. | 382/218 |

* cited by examiner

*Primary Examiner*—Seyed Azarian
(74) *Attorney, Agent, or Firm*—Winston Hsu

(57) ABSTRACT

Fire detection and smoke detection use an image capturing device to obtain images from a predetermined area and adopt an RGB (red, green, blue) color model based chromatic and disorder measurement for extracting flame pixels and smoke pixels. The extracted pixels are inputted to a fire detection fuzzy alarm system to generate an output of alarm information. Based on iterative checking on the growing ratio of the alarm information, a fire alarm is released accordingly.

16 Claims, 10 Drawing Sheets

| Color range | Hue | RGB model |
|---|---|---|
| Red to Yellow | $0°\sim60°$ | $R \geqq G$ and $G>B$ |
| Yellow to Green | $60°\sim120°$ | $G \geqq R$ and $R>B$ |
| Green to Cyan | $120°\sim180°$ | $G \geqq B$ and $B>R$ |
| Cyan to Blue | $180°\sim240°$ | $B \geqq G$ and $G>R$ |
| Blue to Magenta | $240°\sim300°$ | $B \geqq R$ and $R>G$ |
| Magenta to Red | $300°\sim360°$ | $R \geqq B$ and $B>G$ |

Fig. 2

EARLY FIRE DETECTION METHOD AND SYSTEM BASED ON IMAGE PROCESSING

CROSS REFERENCE TO RELATED APPLICATIONS

This is a continuation-in-part of application Ser. No. 11/164,254, filed Nov. 16, 2005, and which is included in its entirety herein by reference.

BACKGROUND OF THE INVENTION

1. Field of the Invention

The present invention relates to a flame detection and smoke detection method and system to give an early fire-alarm information, and more specifically, to a flame detection and smoke detection method and system based on image processing.

2. Description of the Prior Art

Fire has caused countless casualties and damages to our society in the past decades. For years many efforts have been made trying to avoid such great and unpredictable damages with various fire detection technologies or fire prevention devices. Most of the fire detection technologies are base on particle sampling, temperature sampling, relative humidity sampling, air transparency testing, smoke analysis, in addition to the traditional ultraviolet and infrared fire detectors. However, fire detection systems using any of these technologies have so many limitations that the performance of effective fire detection is rarely satisfactory. As some of the systems are limited in applying in only some specific places, for example, the smoke sampling isn't suitable for a kitchen, others are limited in application because of the distance of the fire or the scale of the fire, for example, the detection device using temperature sampling technology can only be activated when the fire has caused a significant increase in the temperature detected by the detection device. Even some are too expensive therefore can only be utilized in important places. These fire detection devices using the above technologies either must be set in the proximity of a fire or can't provide the additional information about the process of burning, such as flame location, size, growing rate, and so on. Thus, they are not always reliable because energy emission of non-flame or byproducts of combustion, which can be yielded in other ways, may be detected by misadventure. This usually results in false alarms. To provide more reliable information about fires, the visual-based approach is becoming more and more interesting.

The prior art flame detection and smoke detection based on image processing uses images detected by an infrared camera. With smoke detection, fire expansion detection, HSI image analysis, and disorder analysis of fire, the prior art fire detection extracts the fire and validates the fire. However, the prior art fire detection method usually results in high false alarms and can't provide an early detection of a fire.

SUMMARY OF THE INVENTION

The claimed invention provides a flame detection method based on image processing. The method comprises capturing images of a predetermined area, detecting number of flame pixels of each image, generating a value according to the number of flame pixels of each image, and comparing values generated from images captured within a predetermined time interval to generate a comparison result.

The claimed invention further provides a smoke detection method based on image processing. The method comprises capturing images of a predetermined area, detecting number of smoke pixels of each image, generating a value according to the number of smoke pixels of each image, and, comparing values generated from images captured within a predetermined time interval to generate a comparison result.

The claimed invention further provides a flame detection and smoke detection system based on image processing. The system comprises an image capturing device for capturing images of a predetermined area, means for detecting number of flame pixels and number of smoke pixels of each image captured by the image capturing device, means for generating a value according to the number of flame pixels or the number of smoke pixels of each image, and means for comparing values generated from images captured by the image capturing device within a predetermined time interval to generate a comparison result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a descriptive table of the relation between hues of an HSI (hue/saturation/intensity) color model and colors of an RGB (Red, Green, Blue) color model.

DETAILED DESCRIPTION

Figure 1:
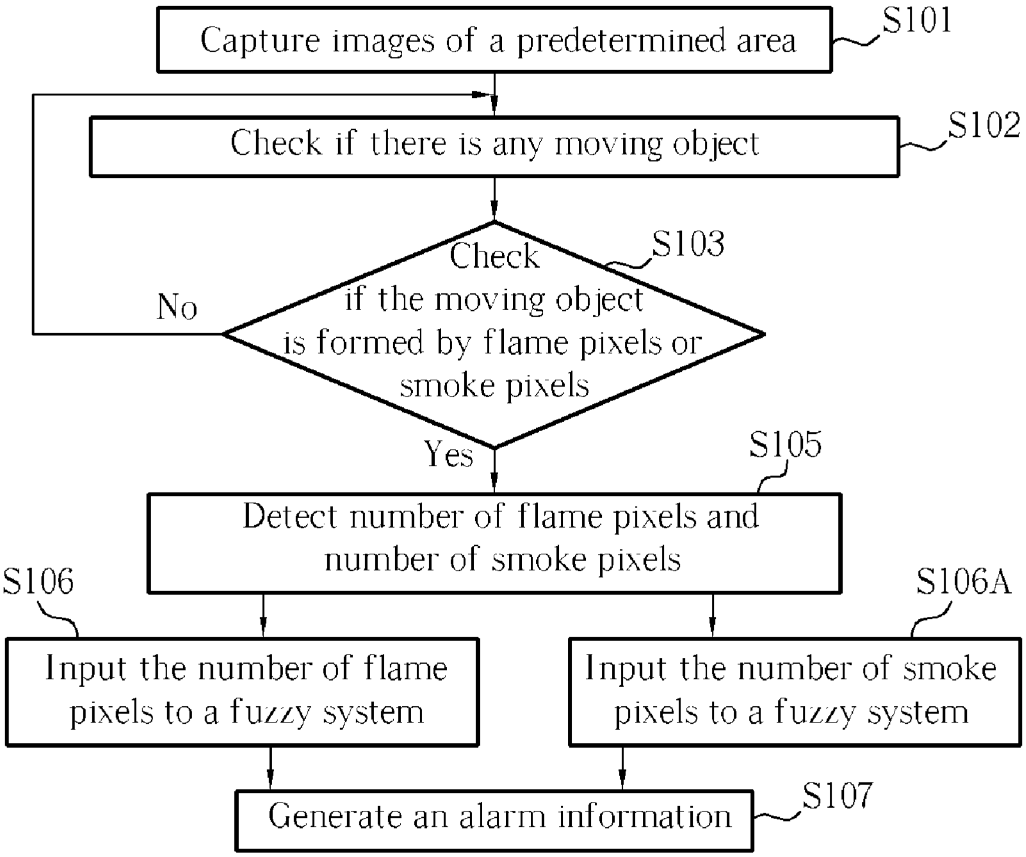
FIG. 1 is a flow chart of the present invention flame detection and smoke detection method.

Please refer to FIG. 1 for an operative flow chart of the present invention flame detection and smoke detection method based on image processing. The flame detection and smoke detection method comprises the following steps but not restricted by the following sequence.

Step S101: Capture images of a predetermined area;

Step S102: Check if the predetermined area contains any moving object;

Step S103: Check if the moving object is formed by flame pixels or smoke pixels; if so, go to Step S105; if not, go to Step S102;

Step S105: Detect number of flame pixels and number of smoke pixels of each image captured in the predetermined area;

Step S106: Input the number of flame pixels and the number of smoke pixels detected in Step S105 to a fire detection fuzzy system;

Step S107: Generate alarm information of each image captured in the predetermined area by the fire detection fuzzy alarm system according to the number of flame pixels and the number of smoke pixels of each image;

First of all, the image capturing device is used to capture images of a predetermined area as in Step S101. Then the images are detected to check whether there is any moving object in the image by checking differences in a plurality of consecutive frames of the predetermined area since flame or smoke is unsteady by nature in Step S102. Next validation of the moving objects as flame or smoke or none of the above is carried out in Step S103. In order to decide whether the detected moving object is flame/smoke or not, the present invention flame detection and smoke detection method uses image processing to validate pixel by pixel of the moving object. Since the RGB (red, green, blue) color format is widely used in most capturing devices, the present invention adopts directly the RGB color model to analyze the characteristics of the flame/smoke pixels in order to avoid the additional operations required in transforming to other color models.

To simulate the color sensing properties of the human visual system, RGB color information is usually transformed into a mathematical space that decouples the brightness (or luminance) information from the color information. Among many color models, HSI (hue/saturation/intensity) color model is very suitable for providing a more people-oriented way of describing the colors, because the hue and saturation components are intimately related to the way in which human beings perceive color.

Based on the common knowledge of fire, it is reasonable to assume that the colors of general flames belong to the red-yellow range. This will map the value of hue of general flames to be distributed from 00 to 600. FIG. 2 shows a descriptive table of the relation between the hue component of the HSI color model and colors of an RGB color model. As a result, the relation of Hue of HSI color model and red, green, and blue components of RGB color model tells us that the fire described in the exemplary embodiment has the characteristics that the red gray level of the flame pixel is no less than the green gray level of the flame pixel, and the green gray level of the flame pixel is larger than the blue gray level of the fire pixel. Thus, we can derive the first condition of validating a pixel as a flame pixel:

Condition 1: $R \geqq G > B$, where R, G, B are red, green, blue gray levels of the pixel respectively.

Figure 3:
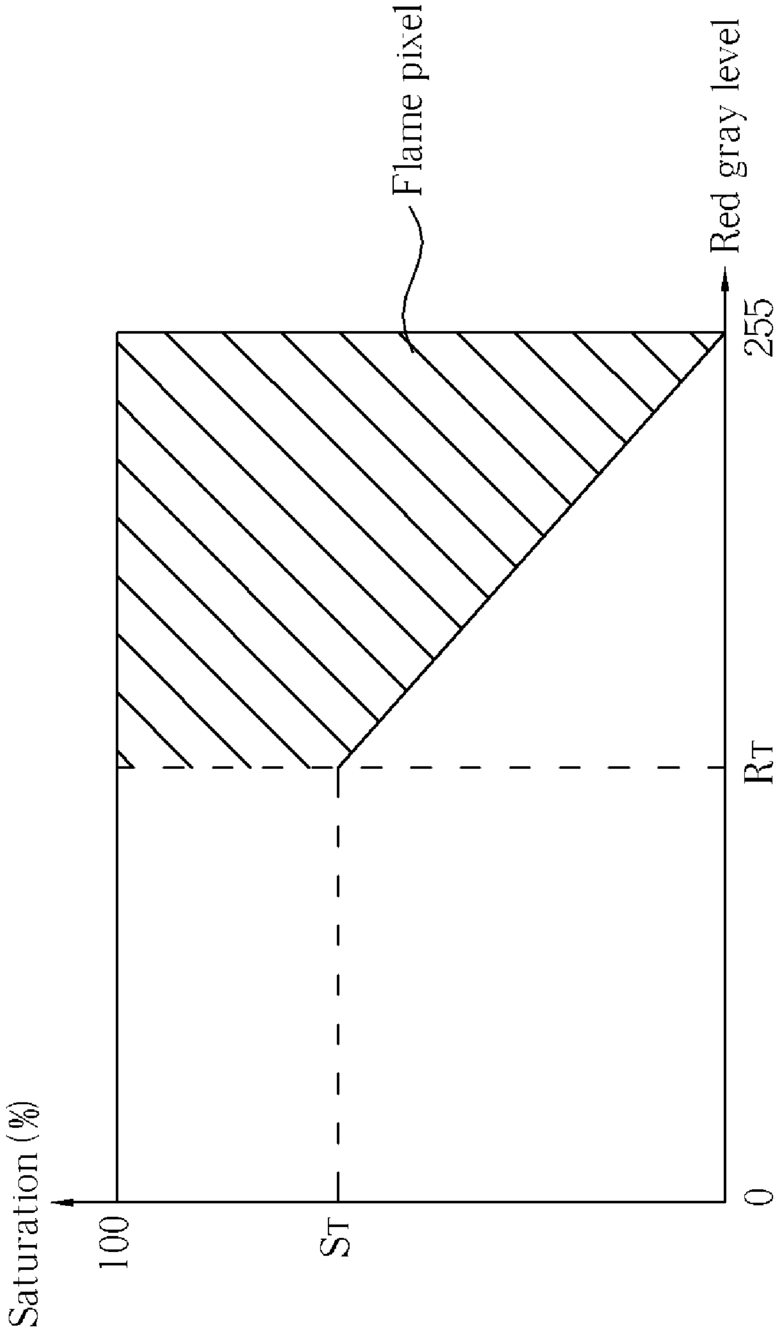
FIG. 3 illustrates a relation between red gray level of a flame pixel and saturation of the flame pixel of an exemplary embodiment.

Please refer to FIG. 3. Since the fire described in the exemplary embodiment possesses a dominant red color, the red gray level of a pixel plays a decisive role in RGB analysis model. Hence, the red gray level should be over a threshold, $R_T$, which introduces a second condition of validating a pixel as a flame pixel:

Condition 2: $R > R_T$, where R is red gray level of the pixel, and $R_T$ is a threshold of the red gray level.

However, the background illumination may affect the saturation of flame or generate a flame-like alias in color, and then result in a false flame-detection. To avoid being confused by the background illumination, the saturation value of the pixel detected should be over a threshold. Since the value of saturation is the value of the red gray level when the red gray level reaches $R_T$ of a pixel, and based on the basic concept, the saturation will degrade with the increasing red gray level. Thus, once the red gray level of a pixel exceeds $R_T$, the saturation of the pixel will decrease down to zero when the red gray level increases up to the top value of 255. FIG. 3 shows the relation between the red gray level and saturation for an extracted flame pixel, which leads to a third condition of validating a pixel as a flame pixel:

Condition 3: $S \geqq ((255-R)*S_T/R_T)$, where S is saturation of a pixel, and $S_T$ is saturation of the pixel when the red gray level of the pixel equals $R_T$.

Besides, when the fire is in a dark environment without other background illumination, the fire will be the major light source. The fire may display partial white in an image captured from an image capturing device. Thus, in such circumstances, the intensity (I) of a pixel will be considered the best parameter in validating a pixel as a flame pixel, and the intensity I of a real flame pixel should be over a threshold of the intensity of the pixel, say, $I_T$. We then add a fourth condition of validation when the predetermined area is in a dark environment:

Condition 4: $I > I_T$.

Based on the above analysis, we can put all the conditions together and propose that a pixel will be validated as a real flame pixel when it satisfies the following conditions:

Condition 1: $R \geqq G > B$;

Condition 2: $R > R_T$;

Condition 3: $S \geqq ((255-R)*S_T/R_T)$; and

Condition 4: $I > I_T$, if the predetermined area is in a dark environment.

Step S103 further comprises the validation of a smoke pixel. Since the smoke usually displays grayish color during a burning process, and such grayish color can be classified into two gray levels: light gray and dark gray, the R, G, B gray levels of a smoke pixel need to be approximately equal. And by experimental results, the intensity (I) of a smoke pixel should be lying in the range of the light gray level or the dark gray level, say, $L_1 \leqq I \leqq L_2$ or $D_1 \leqq I \leqq D_2$, where $L_1$, $L_2$ represent light gray level values and $D_1$, $D_2$ represent dark gray level values and all depend on the statistical data of experiments. Therefore, we introduce two conditions for validating a pixel as a smoke pixel:

Condition 5: $R \pm \alpha = G \pm \alpha = B \pm \alpha$;

Condition 6: $L_1 \leqq I \leqq L_2$ or $D_1 \leqq I \leqq D_2$;

where R, G, B are red, green blue gray levels of the pixel respectively, $\alpha$ is a deviation constant, I is the intensity of the pixel, and $L_1$, $L_2$, $D_1$, $D_2$ are four experimental results of the gray level ranges.

While some flame-like regions in an image may have the same colors as fire, and these flame-similar areas are usually extracted as the real flame from an image, we should validate the moving object as flame or smoke by using the particular characteristic of dynamic disorder of flame/smoke. Since the shape of flame is changeable anytime owing to air flow, we can use the following decision rule to check for the disorder of the moving object:

Condition 7: $(FEP/FTP) \geqq FTD$;

where the parameter FEP denotes the circumference of an object formed by flame pixels of the image, FTP is the number of pixels of the object, and FTD is a disorder threshold that distinguishes from other flame-like objects.

As applied to the moving object formed by flame pixels, the moving object formed by smoke pixels can also be tested by the disorder analysis decision rule.

When the moving object captured in the predetermined area validated as real flame or smoke, then update the number of real flame pixels and the number of real smoke pixels as in Step S105 and input the number of flame pixels and the number of smoke pixels to a fire detection fuzzy system as in Step S106.

Figure 4:
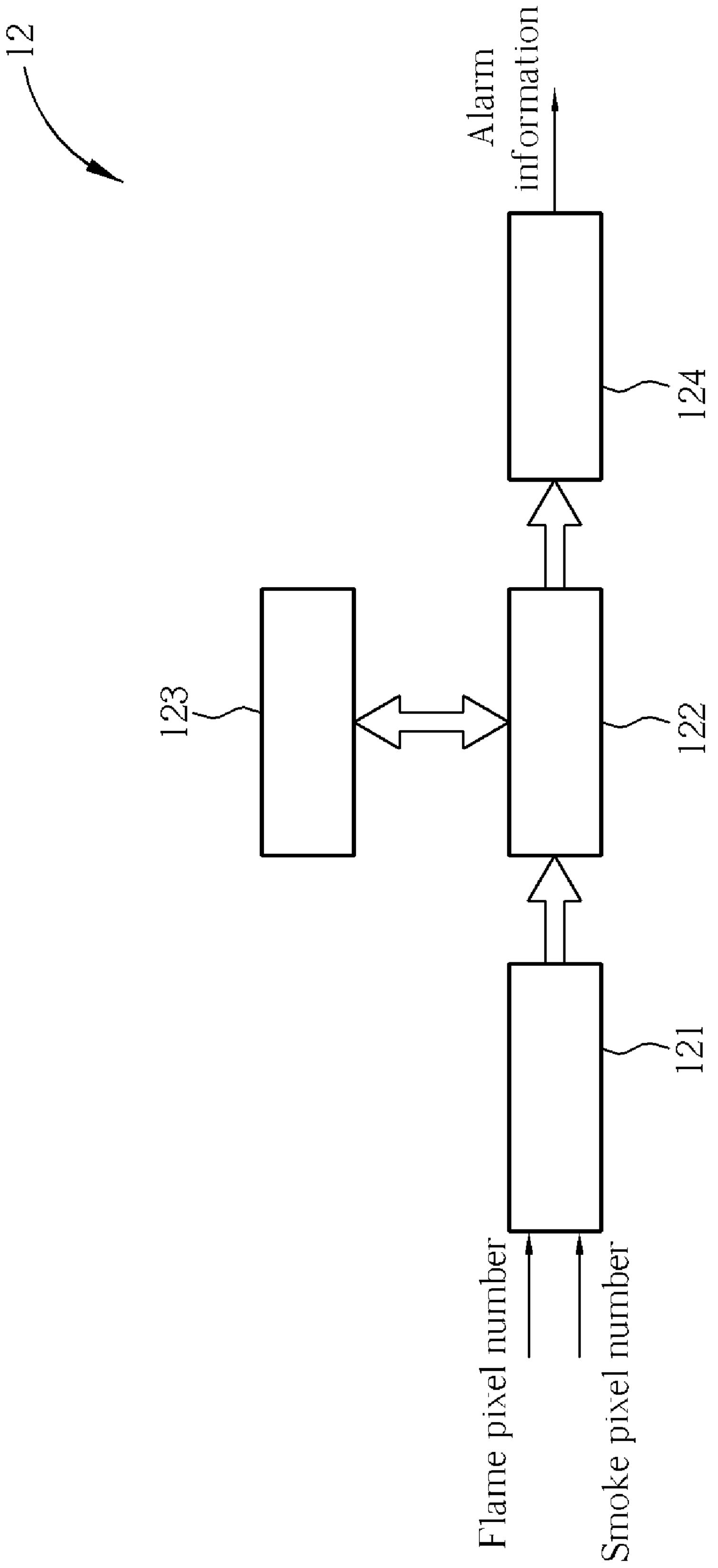
FIG. 4 illustrates a functional block diagram of a fire-alarm fuzzy system.

Please refer to FIG. 4 for a functional block diagram of a fire-alarm fuzzy system 12. The fire alarm fuzzy system 12 comprises a fuzzification model 121, a fuzzy inference engine 122, a fuzzy rule base 123, and a defuzzification model 124. The number of flame pixels and the number of smoke pixels detected in step S105 are the inputs of the fuzzification model 121. The fuzzification model 121 then maps the input value to a fuzzy value according to a built-in membership function, where the fuzzy value ranges from 0 to 1. Take the number of the flame pixels and the number of smoke pixels for instance, the number of flame pixels x and the number of smoke pixels y are mapped to fuzzy set A and fuzzy set B respectively and can be expressed as $\mu_A(X)=A\rightarrow[0,1]$ and $\mu_B(y)=B\rightarrow[0,1]$.

Figure 5:
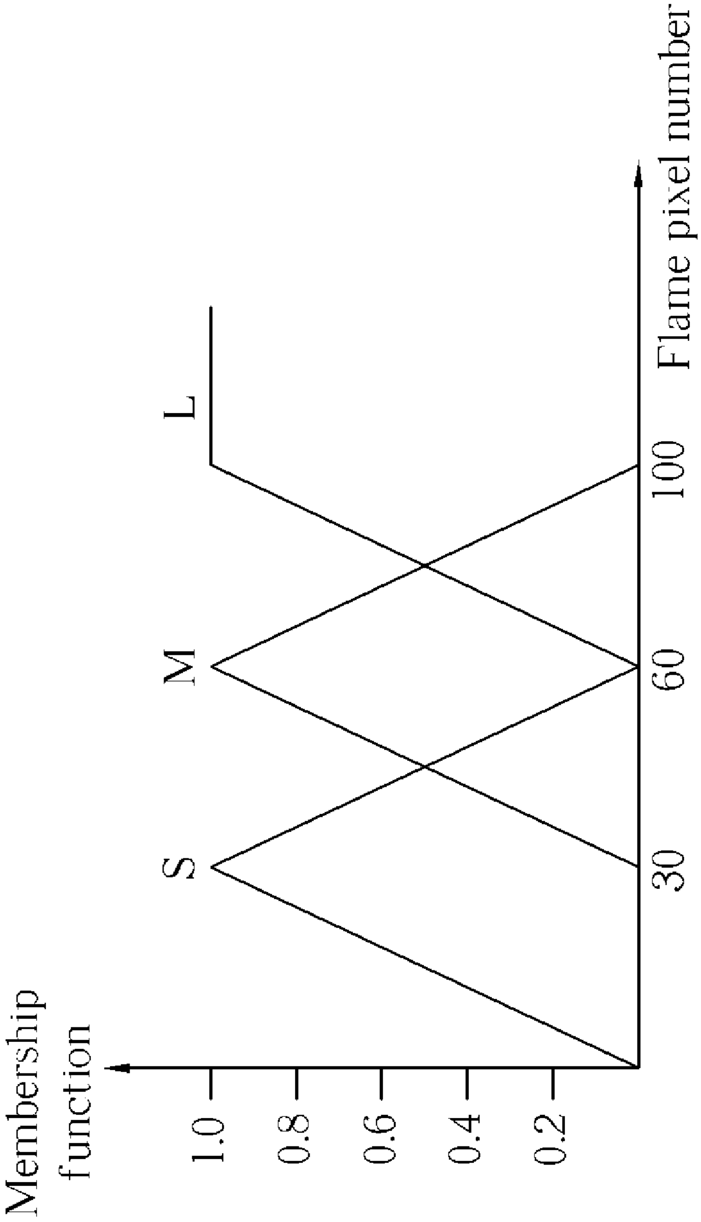
FIG. 5 illustrates a relation between a membership function and the number of flame pixels.
Figure 6:
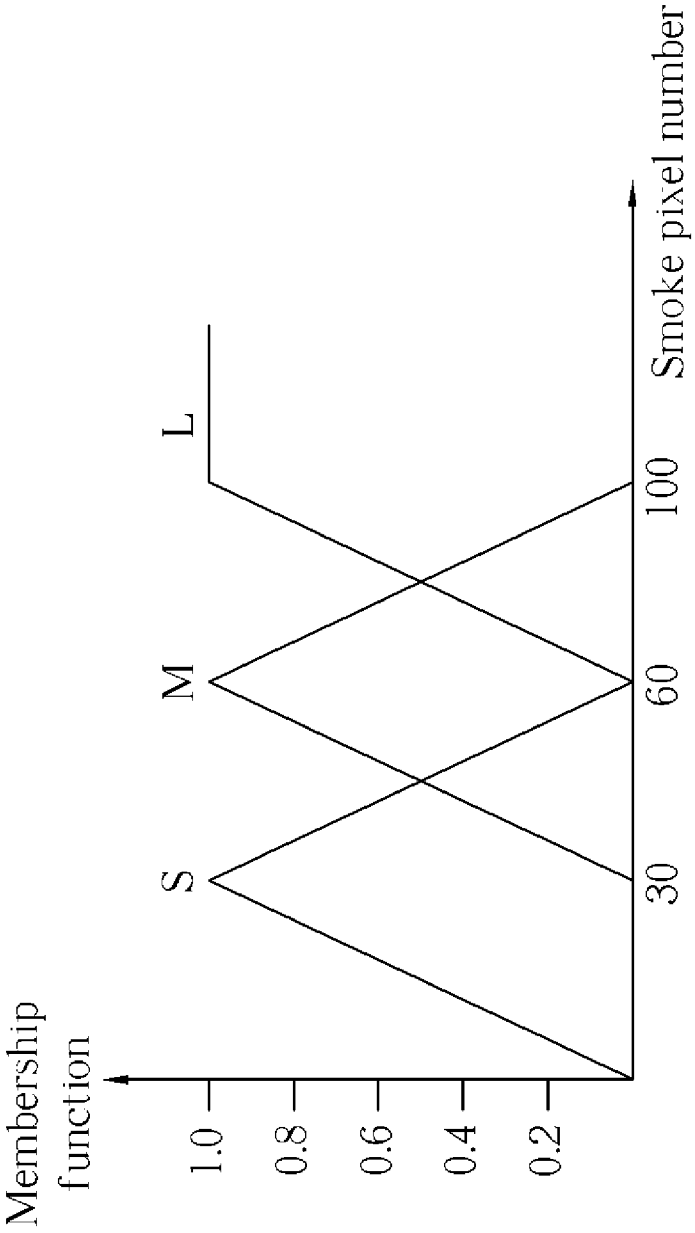
FIG. 6 illustrates a relation between a membership function and the number of smoke pixels.
Figure 7:
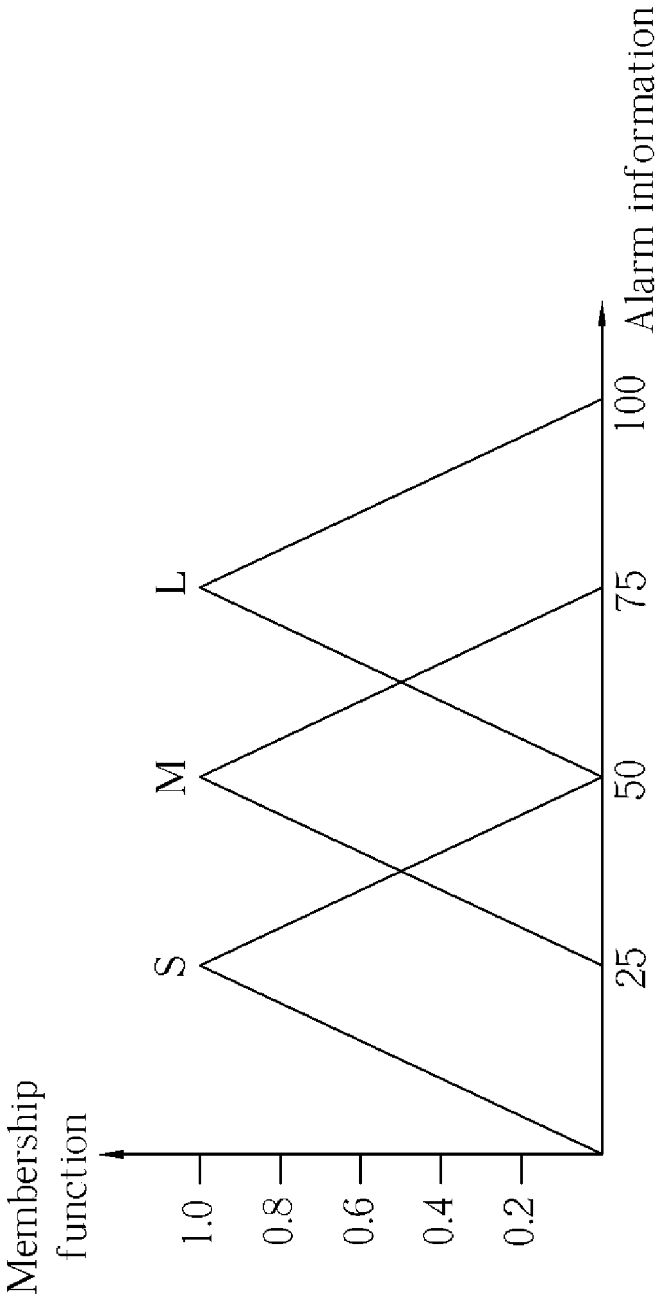
FIG. 7 illustrates a relation between a membership function and the alarm information.

FIG. 5 describes the relationship between membership function and the number of flame pixel. FIG. 6 describes the relationship between membership function and the number of smoke pixel. FIG. 7 describes the relationship between membership function and the alarm information. The membership function in each figure possesses parameters S, M, and L, which stand for 'small', 'medium', and 'large' respectively. Step S107 shows that the fuzzy inference engine 122 adopts a max-max composition ($\mu_R(k)=\max[\mu_A(x),\mu_B(y)]$) from the fuzzy rule base 123 and output the membership function of the output (the alarm information) to the defuzzification model 124. Finally, the defuzzification model 124 defuzzifies the fuzzy output of the alarm information to a crisp value of alarm information.

The present invention flame detection and smoke detection method provides an iterative growth-checking based method to check if the burning fire will spread to cause an accident. The basic concept is that if the alarm information increases with the burning time, the fire is considered to spread out and hence a fire alarm should be given in the while.

Figure 8:
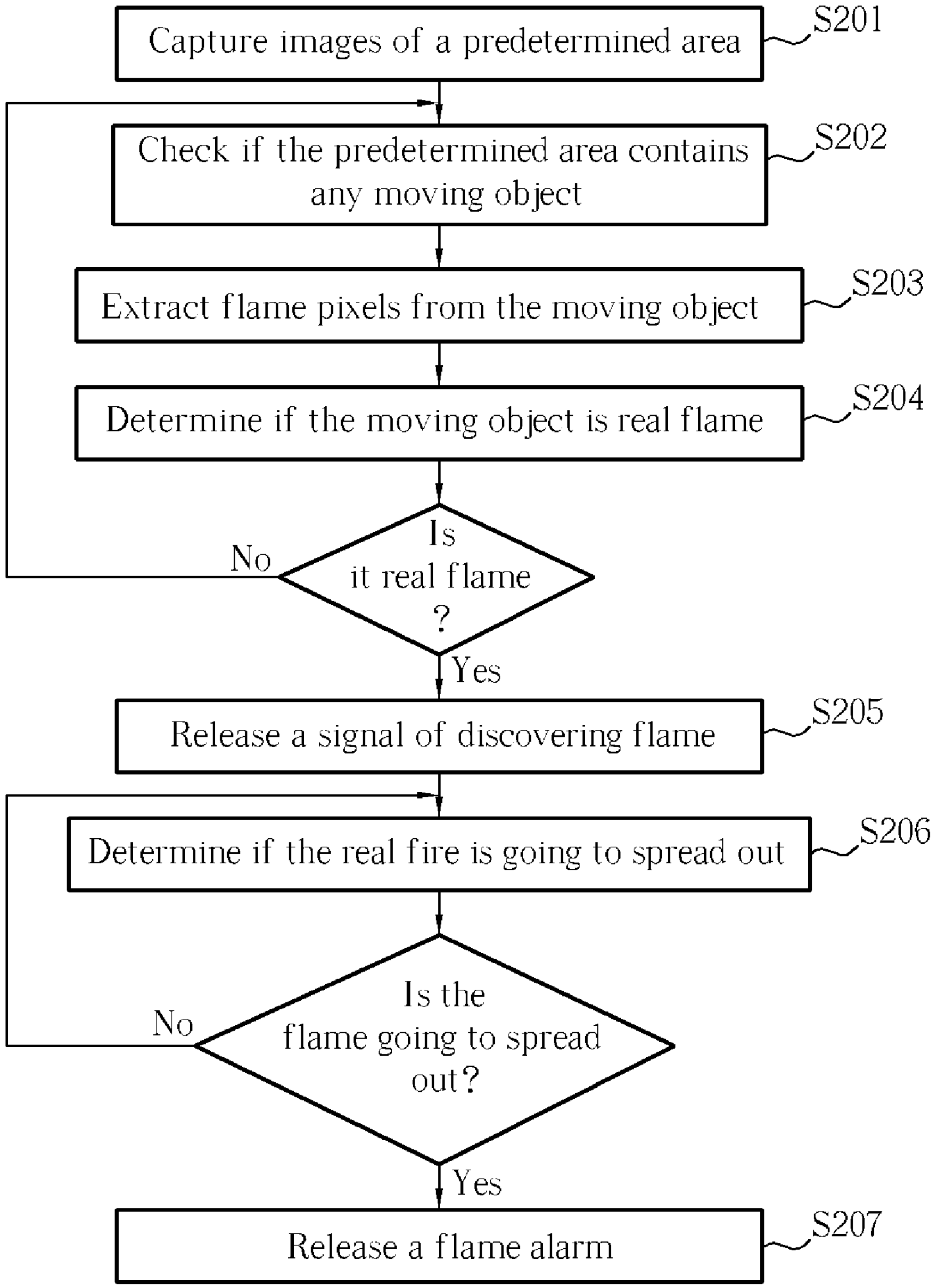
FIG. 8 is a flow chart of the present invention flame detection method.

Another exemplary embodiment of the present invention is described in FIG. 8. The flame detection method includes the following steps:

Step S201: Capture images of a predetermined area;

Step S202: Check if the predetermined area contains any moving object;

Step S203: Extract flame pixels from the moving object;

Step S204: Determine if the moving object is real flame; if so, go to S205; if not, go to S202;

Step S205: Release a signal of discovering flame;

Step S206: Determine if the real flame discovered in S204 is going to spread out by a flame alarm raising process; if so, go to S207, if not, repeat S206;

Step S207: Release a flame alarm.

In Step S203, the early fire detection method uses conditions 1, 2, 3, and 4 as mentioned above to determine whether a pixel in the moving object is a flame pixel. And in Step S204, the moving object is validated as real flame by disorder rule mentioned in condition 7 and a feature of grow of flame pixels. The feature of grow of flame pixels indicates that if a flame-pixel quantity $M_{i+1}$ of a next image frame is greater than a flame-pixel quantity $M_i$ of a current image frame for more than g times at intervals of $t_F$ during a time period T, where g, $t_F$, and T rely on statistical data of experiments, than the moving object is dealt with as real flame.

Next, when real flame is discovered as a signal is released in S206, number eight and number nine conditions are applied to determine if real flame is going to spread out.

Condition 8: $M_{i+1}>M_i$ for $(R/N)>K$; or

Condition 9: $((M_{i+1}-M_i)/M_i)>S$;

Where $M_{i+1}$ and $M_i$ are the flame-pixel quantities of a next image frame and a current image frame respectively, N denotes the times of comparing $M_i$ with $M_{i+1}$ at intervals of $t_R$ during a time period T, R denotes the times of $M_{i+1}>M_i$, K is a number between 0 and 1 relying on statistical data experiments, and S denotes the growing rate of flames and will be more than at least 2 based on experimental results, where S mainly relies on the quantity of fuels.

If condition 8 or condition 9 is satisfied, the real flame is judged to going to spread out and a flame alarm is released as in S207.

Figure 9:
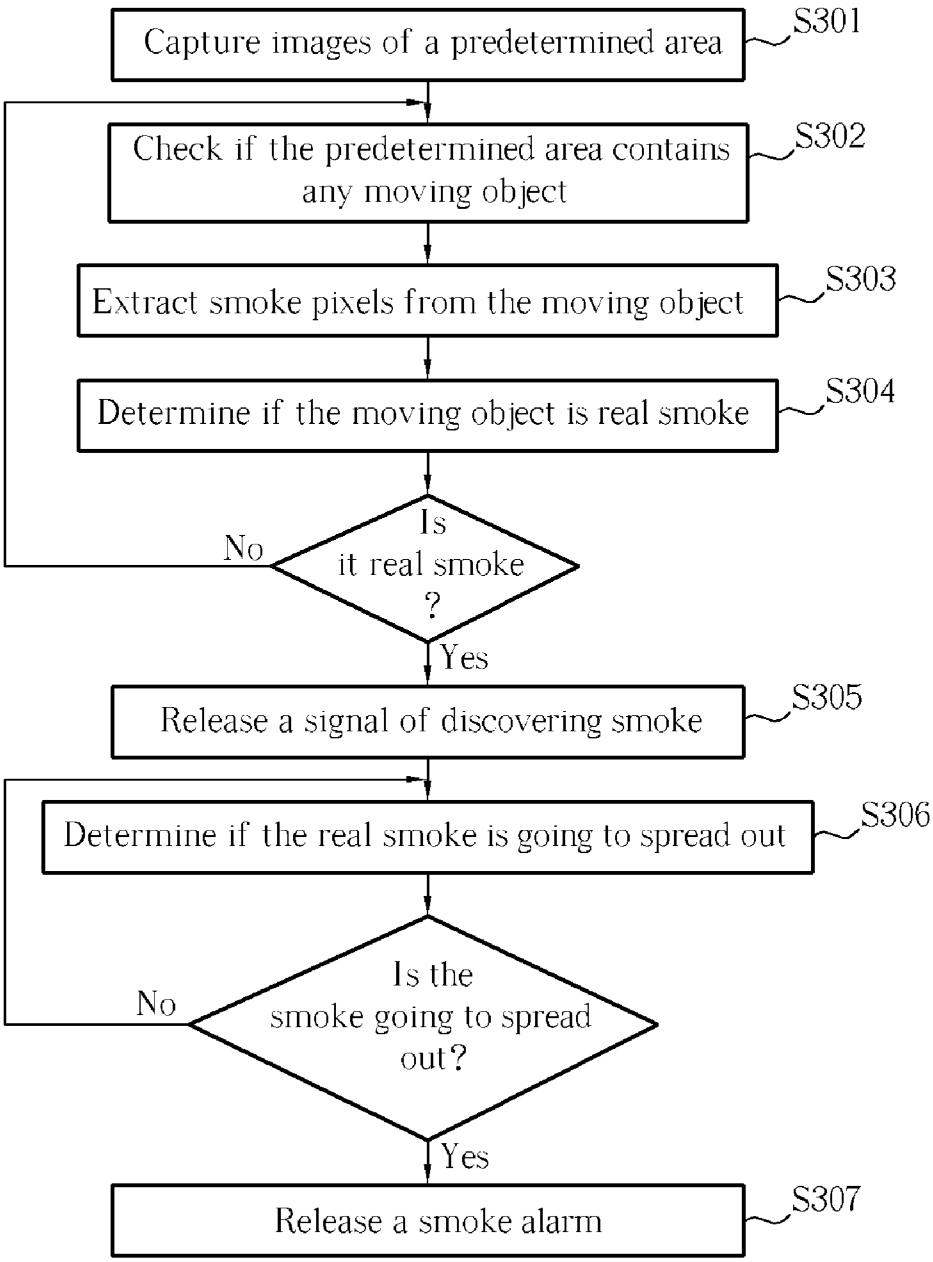
FIG. 9 is a flow chart of the present invention smoke detection method.

Another exemplary embodiment of the present invention is described in FIG. 9. The smoke detection method includes the following steps:

Step S301: Capture images of a predetermined area;

Step S302: Check if the predetermined area contains any moving object;

Step S303: Extract smoke pixels from the moving object;

Step S304: Determine if the moving object is real smoke; if so, go to S305; if not, go to S302;

Step S305: Release a signal of discovering smoke;

Step S306: Determine if the real smoke discovered in S304 is going to spread out by a smoke alarm raising process; if so, go to S307, if not, repeat S306;

Step S307: Release a smoke alarm.

In Step S303, the smoke detection method uses conditions 5 and 6 as mentioned above to determine whether a pixel in the moving object is a smoke pixel. The rest steps of the smoke detection method are similar to those of the flame detection method and if condition 8 is satisfied, the real smoke is determined to going to spread out and a smoke alarm is released as in S307. It should be pointed out that, in condition 8 used for smoke detection, $M_{i+1}$ and $M_i$ mean the smoke-pixel quantities of a next image frame and a current image frame respectively, N denotes the times of comparing $M_i$ with $M_{i+1}$ at intervals of $t_R$ during a time period T, R denotes the times of $M_{i+1}>M_i$, K is a number between 0 and 1 relying on statistical data experiments.

Figure 10:
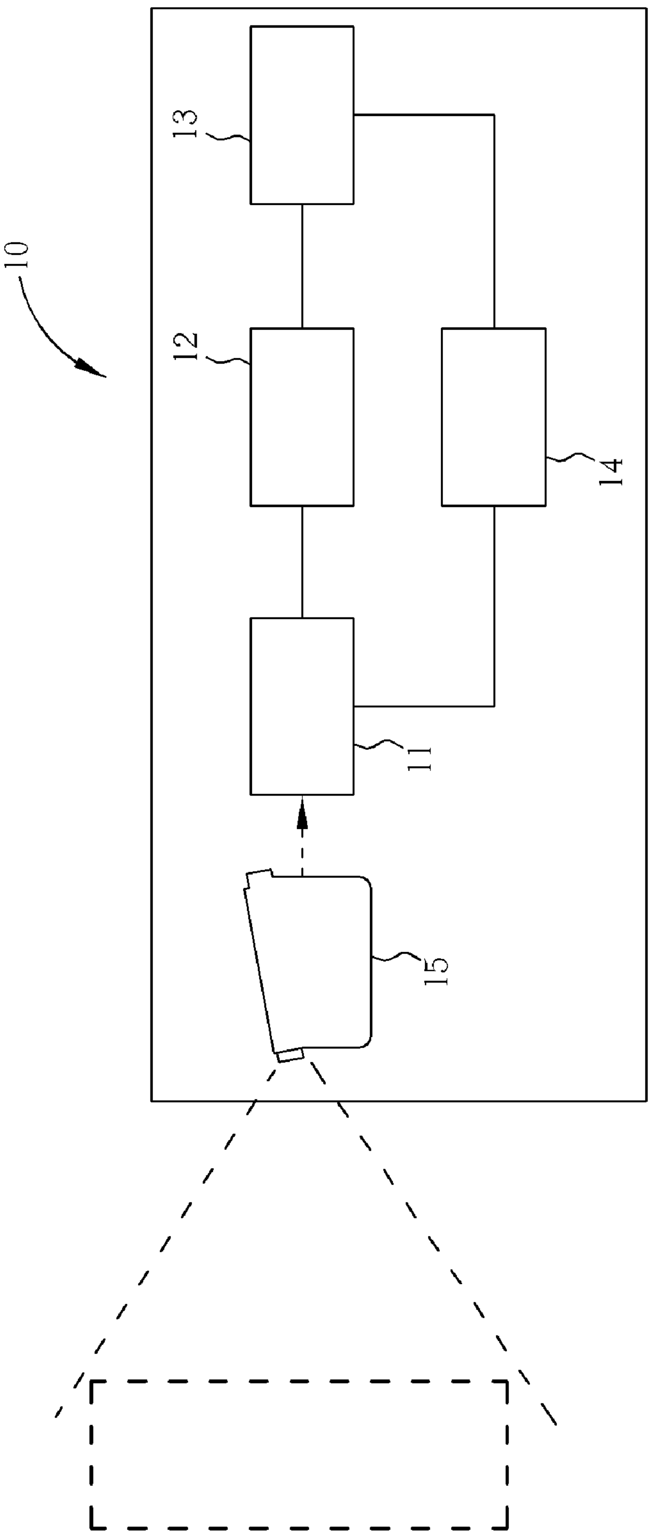
FIG. 10 is a functional block diagram of a fire detection system.

Finally, please refer FIG. 10. The present invention also provides a fire detection system 10 using image processing for achieving early fire detection. The fire detection system 10 comprises an image capturing device 15 for capturing images of a predetermined area, a control unit 11 for detecting number of flame pixels and number of smoke pixels of each image captured by the image capturing device 15, a fire detection fuzzy system 12 for generating a value according to the number of flame pixels and the number of smoke pixels of each image, and a comparator 14 for comparing values generated from images captured by the image capturing device 15 within a predetermined time interval to generate a comparison result.

The exemplary embodiment of the present invention flame detection and smoke detection method and system use techniques of image processing to detect the growing of flame or smoke by analyzing the characteristics of flame and smoke. Once validating a flame or smoke's existence, use a fire detection fuzzy system and a comparative criterion to determine the growing characteristic of the flame or smoke for next step decision. In such combination of fire detection and smoke detection method, the method and system can precisely provide proper information of any fire instance and lower the misreport rate of a fire accident.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flame detection method based on image processing comprising following steps:

(a) capturing images of a predetermined area by an image capturing device;

(b) detecting number of flame pixels of each image by determining if each pixel of each image satisfies the following conditions:

$R>R_T$;

$R\geqq G>B$;

$S\geqq((255-R)*S_T/R_T)$;

wherein R, G, B are red, green, blue gray levels of the pixel respectively, $R_T$ is a threshold of the red gray level, S is saturation of the pixel, and $S_T$ is saturation of the pixel when the red gray level of the pixel equals $R_T$;

(c) generating a value according to the number of flame pixels of each image by a fuzzy system; and (d) comparing values generated from images captured within a predetermined time interval to generate a comparison result.

2. The method of claim 1 further comprising checking if a ratio of number of pixels around circumference of an object formed by flame pixels of the image and number of pixels of the object is greater than a disorder threshold.

3. The method of claim 1 wherein step (d) comprises generating a comparison result when the flame-pixel quantities of images satisfies the following condition:

$M_{i+1}>M_i$ for $(R/N)>K$;

where $M_{i+1}$ and $M_i$ are the flame-pixel quantities of a next image and a current image respectively, N denotes the times of comparing $M_i$ with $M_{i+1}$ at intervals of $t_R$ during a time period T, R denotes the times of $M_{i+1}>M_i$, and K is a number between 0 and 1 relying on statistical data experiments.

4. The method of claim 1 wherein step (d) comprises generating a comparison result when the flame-pixel quantities of images satisfies the following condition:

$((M_{i+1}-M_i)/M_i)>S$;

where $M_{i+1}$ and $M_i$ are the flame-pixel quantities of a next image frame and a current image frame respectively, and S denotes the growing rate of flames.

5. The method of claim 1 further comprising releasing an alarm.

6. A smoke detection method based on image processing comprising following steps:

(a) capturing images of a predetermined area by an image capturing device;

(b) detecting number of smoke pixels of each image;

(c) generating a value according to the number of smoke pixels of each image by a fuzzy system; and (d) comparing values generated from images captured within a predetermined time interval to generate a comparison result when the smoke-pixel quantities of images satisfies the following condition:

$M_{i+1}>M_i$ for $(R/N)>K$;

where $M_{i+1}$ and $M_i$ are the smoke-pixel quantities of a next image and a current image respectively, N denotes the times of comparing $M_i$ with $M_{i+1}$ at intervals of $t_R$ during a time period T, R denotes the times of $M_{i+1}>M_i$, and K is a number between 0 and 1 relying on statistical data experiments.

7. The method of claim 6 wherein step (b) comprises updating the number of smoke pixels when red, green and blue gray levels of a pixel of the image are approximately equal, and intensity of the pixel is within a predetermined range.

8. The method of claim 6 further comprising checking if a ratio of number of pixels around circumference of an object formed by smoke pixels of the image and number of pixels of the object is greater than a disorder threshold.

9. The method of claim 6 further comprising releasing an alarm.

10. A flame detection and smoke detection system based on image processing comprising:

an image capturing device for capturing images of a predetermined area;

means for detecting number of flame pixels and number of smoke pixels of each image captured by the image capturing device by determining if each pixel of each image satisfies the following conditions:

$R>R_T$;

$R\geqq G>B$;

$S\geqq((255-R)*S_T/R_T)$;

wherein R, G, B are red, green, blue gray levels of the pixel respectively, RT is a threshold of the red gray level, S is saturation of the pixel, and ST is saturation of the pixel when the red gray level of the pixel equals RT;

a fuzzy system for generating a value according to the number of flame pixels or the number of smoke pixels of each image; and means for comparing values generated from images captured by the image capturing device within a predetermined time interval to generate a comparison result.

11. The system of claim 10 further comprising means for detecting a moving object of the predetermined area.

12. The system of claim 11 further comprising means for verifying the moving object as a real flame.

13. The system of claim 11 further comprising means for verifying the moving object as a real smoke.

14. The system of claim 10 further comprising means for outputting an alarm.

15. The system of claim 10 wherein the image capturing device is a camera.

16. The system of claim 10 wherein the image capturing device is a camcorder.

* * * * *